UNITED STATES PATENT OFFICE.

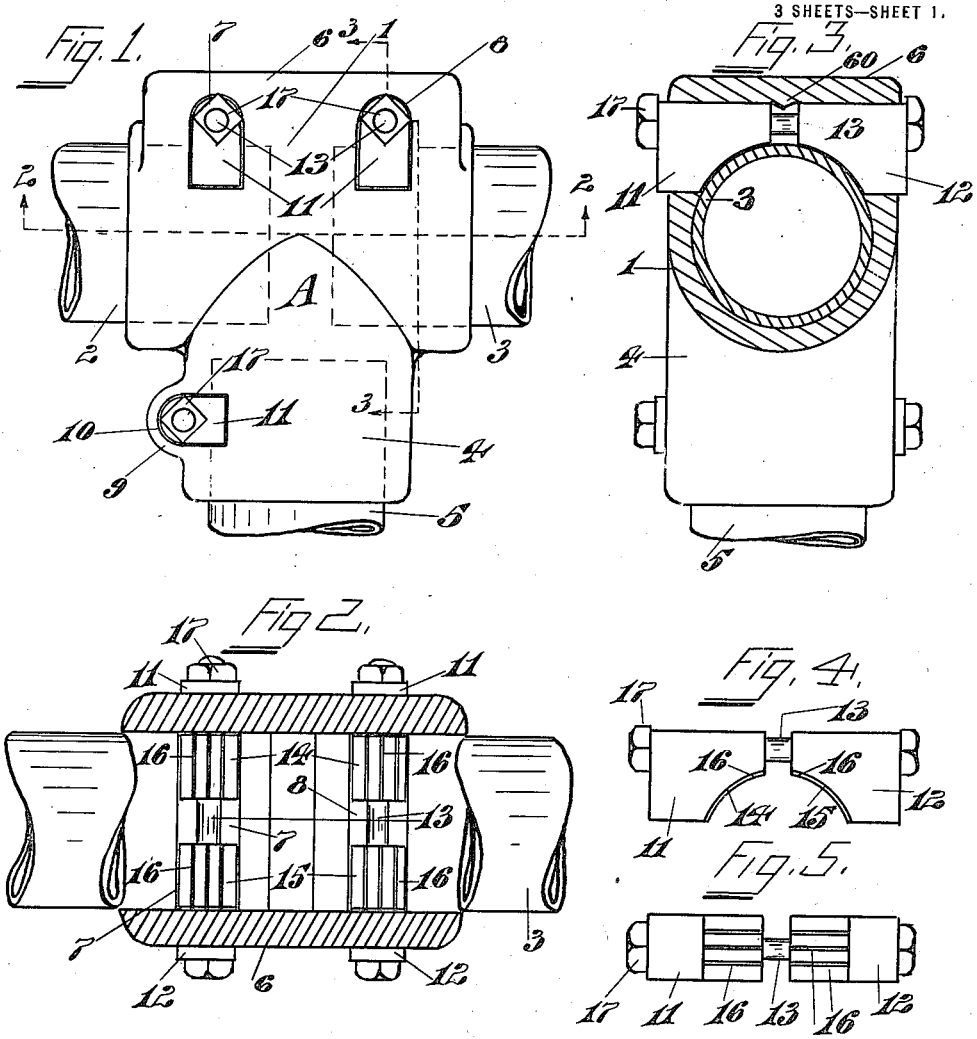

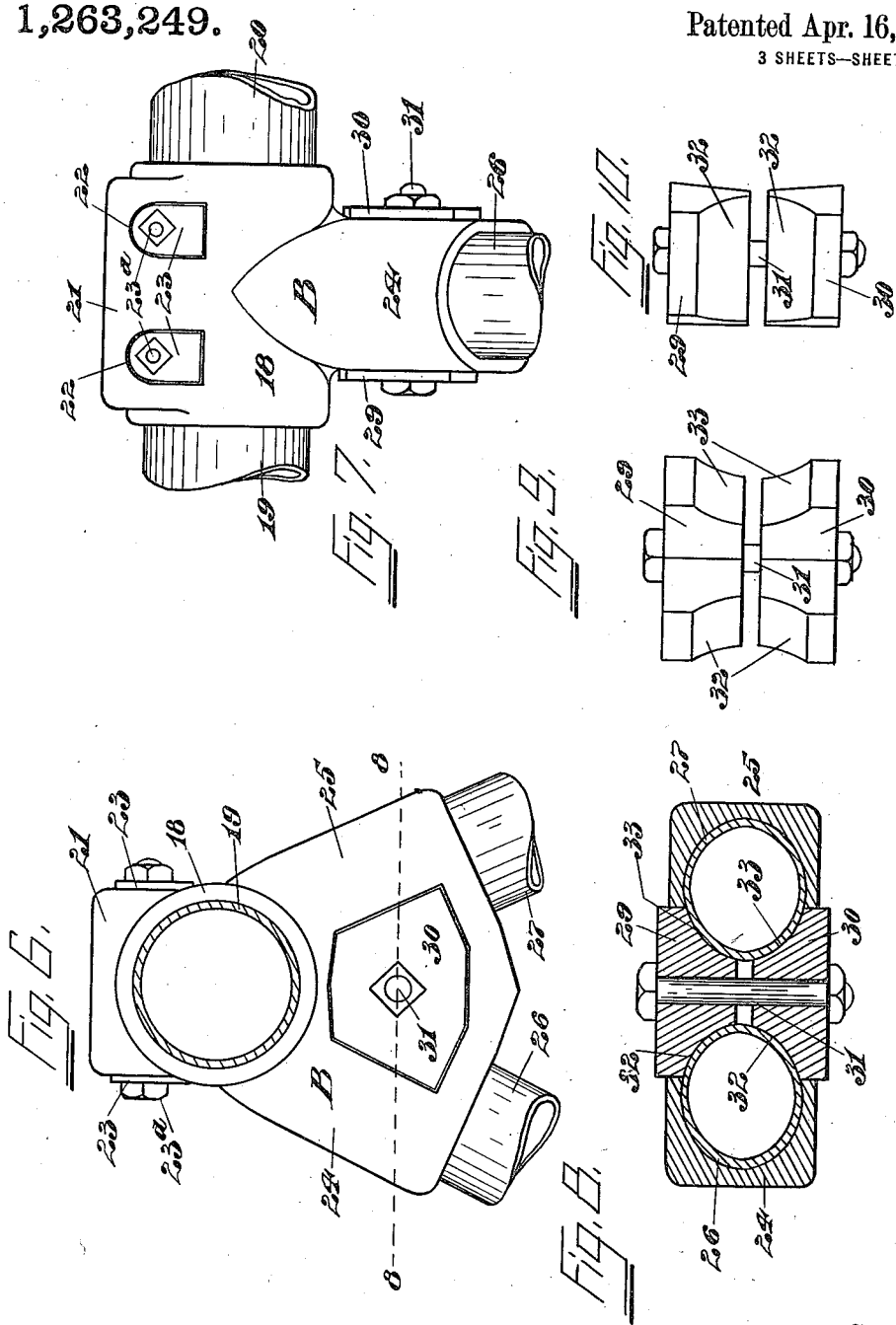

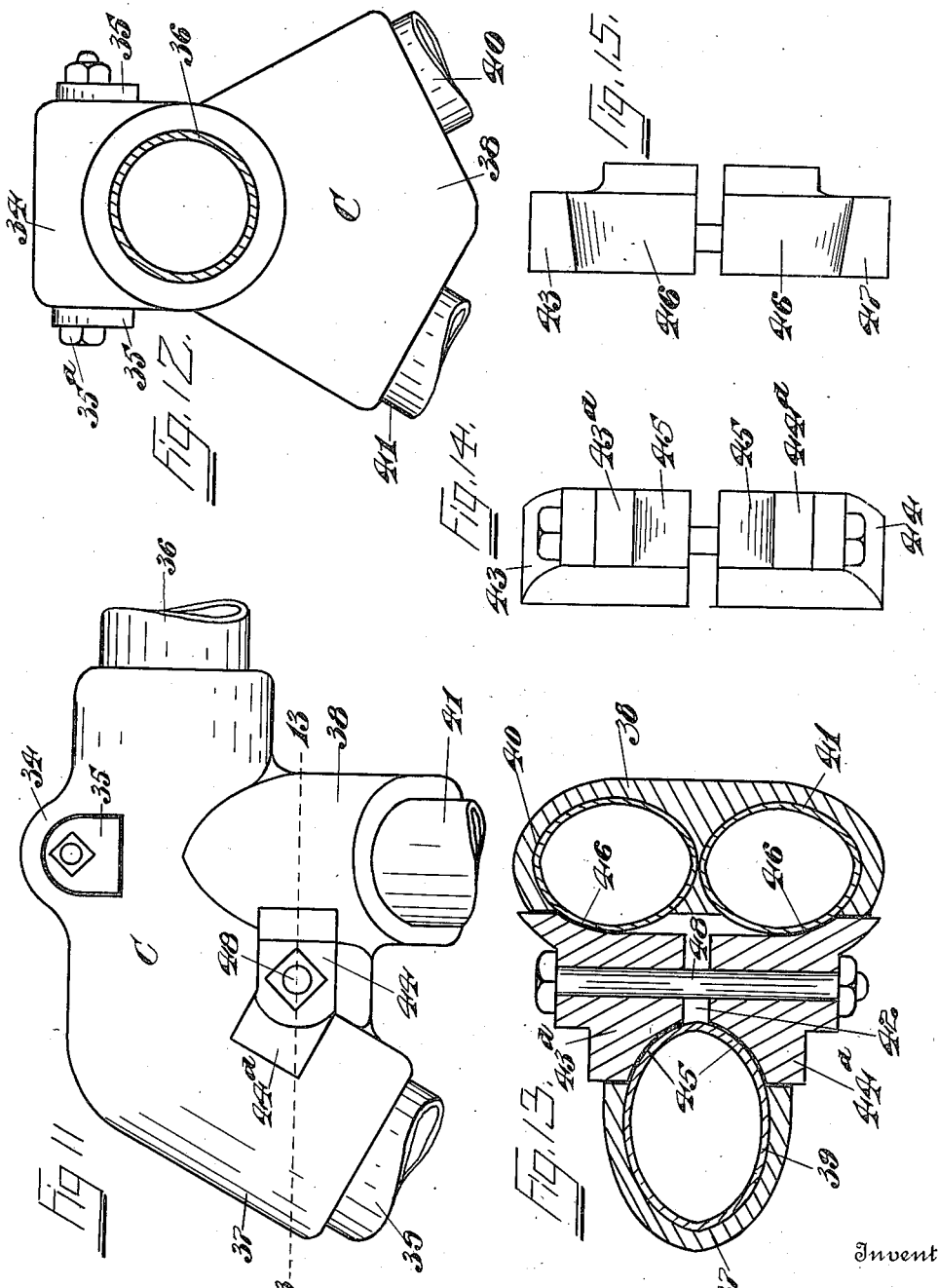

CHARLES E. HOPPES, OF SPRINGFIELD, OHIO.

COUPLING FOR TUBULAR FRAMEWORK.

1,263,249.  Specification of Letters Patent.  Patented Apr. 16, 1918.

Application filed February 28, 1914. Serial No. 821,684.

*To all whom it may concern:*

Be it known that I, CHARLES E. HOPPES, a citizen of the United States, residing at Springfield, in the county of Clark and State of Ohio, have invented certain new and useful Improvements in Couplings for Tubular Framework, of which the following is a specification.

This invention relates to improvements in joints or couplings for metallic framework, particularly that type of frame-work which is adapted to be installed at the place where it is used, such as frames for playground apparatus.

The object of the invention is to provide a joint or coupling which will be simple and effective in construction, easily installed, and which will require no alteration in the frame proper at the time of installation.

In the accompanying drawings,—

Figure 1 is a side elevation of a joint embodying my improvements.

Fig. 2 is a section on the line 2—2 of Fig. 1, a portion of the frame parts being broken away to better illustrate the clamping devices.

Fig. 3 is a section on the line 3—3 of Fig. 1.

Fig. 4 is a side view of the clamping devices.

Fig. 5 is a bottom plan of the same in the position they occupied in Fig. 4.

Fig. 6 is an end view of another form of joint, showing the manner of applying my improvements thereto.

Fig. 7 is a side view of the same.

Fig. 8 is a section on the line 8—8 of Fig. 6.

Fig. 9 is a top plan view of the form of clamp used in connection with this type of joint.

Fig. 10 is a side view of the same.

Fig. 11 is a side view of another form of joint used in connection with the apparatus to which my invention relates, showing my improvements applied thereto.

Fig. 12 is an end view of the same.

Fig. 13 is a section on the line 13—13 of Fig. 11.

Fig. 14 is a side view of a pair of clamps used in connection with this last type of joint.

Fig. 15 is a view of the opposite side of the same.

Like parts are represented by similar characters of reference throughout the several views.

Referring to Figs. 1 to 5 inclusive, the joint or coupling, A, illustrated, is one for connecting three members of the frame, one of which is arranged at right-angles to the other two. This joint consists of an integral casting, cored out to form a transversely chambered portion 1 for the reception of the alined frame members, 2 and 3, and also a vertically-arranged chambered portion, 4, for the reception of the vertically arranged frame member, 5; these frame members being preferably in the nature of hollow tubes or pipes. The casting is also provided with an enlargement, 6, through which extends chambers, 7 and 8, for the reception of the clamping devices, these chambers 7 and 8 being transverse to and partly intersecting the chambered portion 1. The vertical chambered portion 4 also has an enlargement, 9, through which extends the chamber, 10, intersecting the said chambered portion 4. Located in each one of these chambers, 7, 8, and 9, is a clamping device consisting of a pair of apertured blocks, 11 and 12, connected by a bolt, 13. The blocks have their proximate ends formed with concave recesses, 14 and 15, shaped to conform to the contour of the frame member, and each concave portion is also preferably provided with serrations, 16. In assembling the frames, the ends of the tubular frame members are inserted within the casting forming the joint after the clamping devices have been placed in their respective chambers, whereupon, by tightening the nuts 17 of the bolts 13, the clamping devices are drawn together to cause them to firmly impinge the respective frame members and securely clamp them in position, the serrations biting into the metal of the frame members and serving to assist in more effectually clamping the parts together.

A structural feature of especial advantage involves the relation of the clamping blocks and the chambers in which they are mounted whereby said blocks may, in adjustment, have sliding movement lengthwise of said chambers but are positively held against rotation therein. The simplest, most satisfactory and least expensive way of achieving this relation is by making said chambers, in at least part of their cross section, of flat sided form and by shaping the blocks, cross sectionally, whereby they will have a conforming and somewhat close fit in said chambers. The sliding but non-rotatable fit of the clamping blocks in their chambers is of advantage in that, as the coupling is originally made up the blocks will be positively positioned and retained whereby their concave engaging faces will form parts of the circle of the main chamber with which they may be associated, thus leaving the way clear for the insertion into or through said main chamber and under the blocks of the frame part to be secured. Consequently in connection with the described assemblage of the coupling and frame parts, the clamping blocks will be automatically and positively centered relatively to the frame parts by the mere act of inserting or fitting said clamping blocks in their chambers and the fitting of the frame parts and the operation of tightening the blocks against said parts may always be performed without any complexity of additional adjustment.
A further advantage of the flat-sided form of the clamping blocks, in connection with their conforming fit in the chamber provided for them, is that the engaging faces 14—15 of the blocks may be made of sensible or substantial area, both circumferentially and longitudinally, and hence particularly effective for the work in hand, while the blocks themselves may be of relatively small or compact form and may be made in a variety of shapes, as best adapted to meet the various exigencies which may be encountered in frame structures of the character previously referred to.

By my present construction, I am enabled to secure the parts of a metallic frame together without in any manner altering the members of the frame, such as by drilling holes in them for the reception of bolts. In view of the fact that it is common to have the piping or tubes which form the frame shipped to the point where it is to be installed direct from the tube factory, it will be seen that by enabling these tubular frame members to be placed together without any alteration upon the ground, is a very material benefit, as it permits the frame to be placed together by workmen who need not necessarily have any special skill and requires the use of no tools other than a wrench to tighten the nuts of the bolt.

In Figs. 6 to 10 inclusive, the invention has been shown applied to a coupling joint of different form than that shown in the preceding figures. In this case, the casting, B, is provided with a transverse chambered portion, 18, for the reception of the alined frame members, 19 and 20, which are clamped in the same manner described in connection with the previous construction;
that is, the part 18 is provided with an enlargement 21, in which are transverse chambers, 22, partly intersecting the main chamber, 18, and in each of which is placed a pair of clamping blocks 23 and bolt 23ª, constructed and operating in the same manner as the blocks 11 and 12. The coupling, B, however, is formed with chambered portions, 24 and 25, arranged at an angle or obliquely to the chambered portion 18 so as to receive angularly projecting tubular frame members 26 and 27. A single pair of clamping blocks, 29 and 30, apertured to receive the clamping bolt, 31, is in this case employed to clamp the members 26 and 27.
Each side of each of the blocks is formed with an angularly-extending or inclined concave recess, 32 and 33, shaped to conform to the contour of the respective frame members, and these recesses may have serrations such as described in connection with the blocks 11 and 12.

In Figs. 11 to 15 inclusive is shown a construction in which three frame members are clamped by a single pair of clamping blocks.
In this construction, the casting, C, is provided with a chambered portion, 34, for the reception of a pair of clamping blocks, 35 and their bolt, 35ª, to secure in position the tubular frame member 36; these clamping blocks 35 being formed similar to the blocks 11 and 12, previously described. The casting, C, is also provided with a chambered portion, 37, and a double chambered portion, 38, for the reception of tubular frame members 39, 40, and 41. Between the chambered portions 37 and 38 is a transversely arranged chamber, 42, in which is located clamping blocks, 43 and 44. Each of the blocks has an angularly arranged portion, represented by 43ª and 44ª, provided with a concave face, 45, and the other side of each of the blocks has an angularly arranged concave face, 46, so that when the blocks are drawn together by the clamping bolt, 48, these faces will be caused to engage and clamp the respective frame members, 39, 40 and 41.

In order to hold the clamping devices in their chambers during transportation, I have provided each chamber with a centrally-arranged projection, 60, as shown in Fig. 3, so that after the clamping blocks 11 and 12 and their bolt have been placed in position therein, they will be prevented from slipping out of the chamber in either direction.

Having thus described my invention, I claim:—

1. A coupling for metallic frames having a frame-part-receiving chambered portion, a chamber transverse to and partly intersecting said chambered portion, a pair of clamping blocks having a somewhat close fit in said chamber and slidably adjustable lengthwise of said chamber, said chamber and said clamping blocks having conforming cross sectional outlines whereby said clamping blocks are positively held against turning movement in said chamber, said clamping blocks having frame-part-engaging faces of substantial circumferential and longitudinal area and which form continuations of the cross sectional outline of said chambered portion, and a connection between said clamping blocks having means for adjusting them into clamping relation.

2. A coupling for metallic frames having a frame-part-receiving chamber, a second chamber transverse to and partly intersecting said frame-part-receiving chamber, a pair of clamping blocks having a somewhat close fit in said second chamber and slidably adjustable lengthwise of said second chamber, said second chamber and said clamping blocks having conforming cross sectional outlines whereby said clamping blocks are positively held against turning movement in said second chamber, said clamping blocks having at their proximate ends frame-part-engaging faces of substantial circumferential and longitudinal area and which form continuations of the cross sectional outline of said frame-part-receiving chamber and a connection between said clamping blocks having means for adjusting them toward one another and into clamping relation.

3. A coupling for metallic frames having a frame-part-receiving chambered portion, a chamber transverse to and partly intersecting said chambered portion, a pair of clamping blocks having a somewhat close fit in said chamber and slidably adjustable lengthwise of said chamber, said chamber and said clamping blocks having conforming cross sectional outlines whereby said clamping blocks are positively held against turning movement in said chamber, said clamping blocks having frame-part-engaging faces of substantial circumferential and longitudinal area and which form continuations of the cross sectional outline of said chambered portion, a connection between said clamping blocks having means for adjusting them into clamping relation and means in association with said chamber and said clamping blocks for preventing displacement of said clamping blocks from said chamber, when the coupling is not in association with the frame parts.

4. A coupling for metallic frames having a frame-part-receiving chambered portion, a chamber transverse to and partly intersecting said chambered portion, a pair of clamping blocks having a somewhat close fit in said chamber and slidably adjustable lengthwise of said chamber, said chamber and said clamping blocks having conforming cross sectional outlines whereby said clamping blocks are positively held against turning movement in said chamber, said clamping blocks having frame-part-engaging faces of substantial circumferential and longitudinal area and which form continuations of the cross sectional outline of said chambered portion, a connection between said clamping blocks having means for adjusting them into clamping relation, and a projection formed internally of said chamber and extending into the space between said clamping blocks to prevent their displacement from said chamber when the coupling is not in association with the frame parts.

In testimony whereof, I have hereunto set my hand this 18th day of January, 1913.

CHARLES E. HOPPES.

Witnesses:
  Chas. I. Welch,
  Fay M. Smith.